April 7, 1959
F. O. WISMAN
2,880,759
HYDRO-PNEUMATIC ENERGY STORAGE DEVICE
Filed June 6, 1956
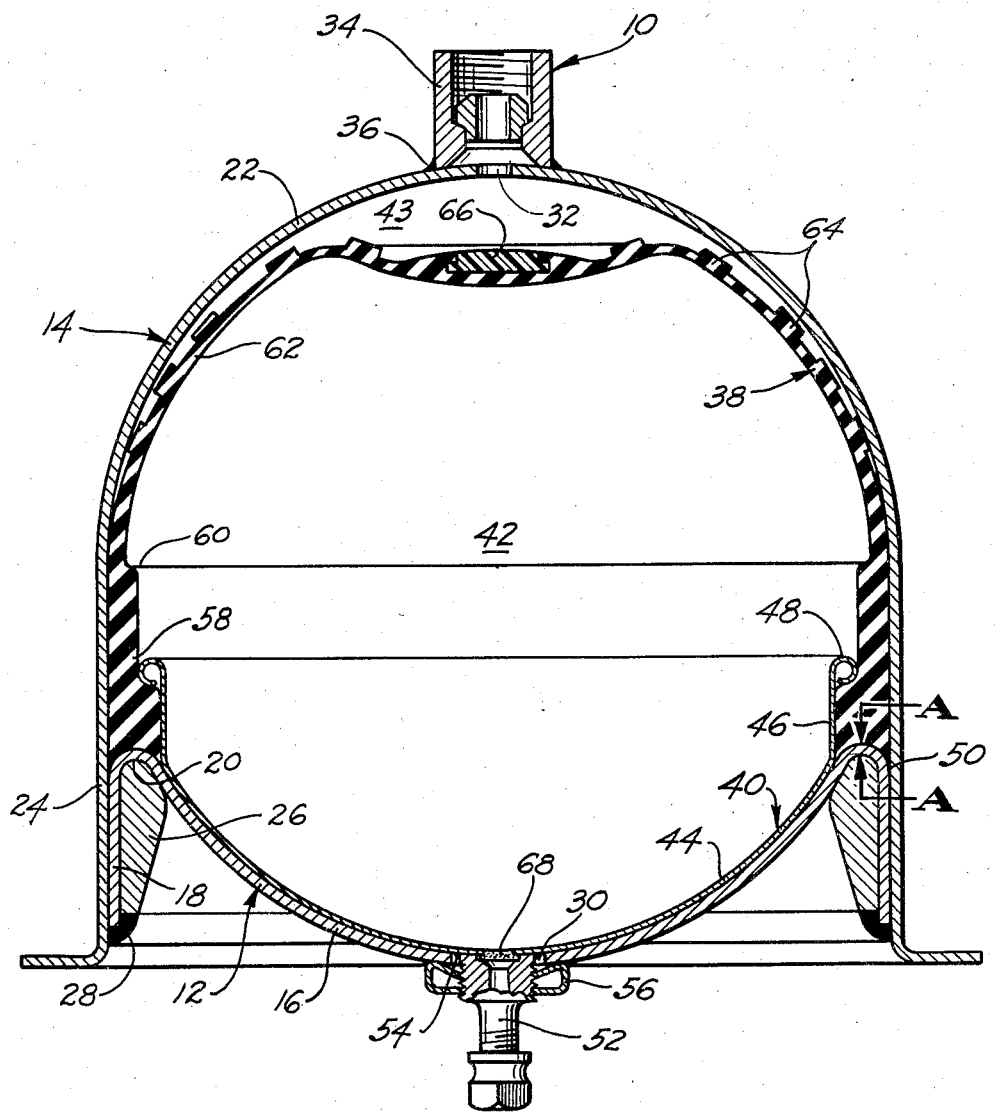
INVENTOR.
FRANKLIN O. WISMAN
BY
*William N. Antonis*
ATTORNEY.

United States Patent Office 2,880,759
Patented Apr. 7, 1959

2,880,759

HYDRO-PNEUMATIC ENERGY STORAGE DEVICE

Franklin O. Wisman, South Bend, Ind., assignor to Bendix Aviation Corporation, South Bend, Ind., a corporation of Delaware Application June 6, 1956, Serial No. 589,660

6 Claims. (Cl. 138—30)

This invention relates to hydro-pneumatic energy storage devices, and more specifically to improvements in an accumulator of the bladder type.

In general, accumulators comprise a shell or a plurality of shells having a gas chamber and a hydraulic chamber with a flexible partition therebetween, so that the hydraulic fluid will not be contaminated by having the gas dissolve in it. The hydraulic fluid is under pressure from a pump and acts against compressed air or other gas which has been placed in the gas chamber. The compressed gas exerts a steady pressure on the liquid, but is compressible so that varying quantities of liquid may be stored in the accumulator. Since accumulators have a high internal pressure, it is important to use a truly spherical form for the accumulator especially where light weight is desirable because the stability of the spherical form permits the use of relatively thin gauge material for the shell or shells. With such a stable form, fabricated according to the teaching of this disclosure, the only stresses which must be withstood are simple tensile bursting stresses occasioned by the internal pressure.

Accumulators of the general type to which this invention relates may be used in automotive or aircraft hydraulic systems where many devices are operated from fluid under pressure from one pump. In these systems a power driven pump is continuously operated, but since the many devices may be operated intermittently the required liquid may be less or greater than the output of the pump. When the liquid demand is less than the pump output, liquid is stored under pressure in the accumulator, and when the accumulator is filled, the pump output is bypassed to the reservoir. When the liquid demand exceeds the capacity of the pump, the accumulator supplies the necessary liquid under pressure. Thus one purpose of an accumulator is to permit the use of a small pump for a hydraulic system with momentary demands in excess of the capacity of the pump.

The hydro-pneumatic device to which this invention relates may also be adapted for use in vehicular air suspension systems.

Prior to the advent of this invention, accumulators with good operating characteristics were relatively expensive to fabricate or were too bulky or heavy. Those which were somewhat cheaper to fabricate often did not function properly, or were short lived.

It is therefore an object of this invention to provide a compact, lightweight accumulator which is capable of being economically fabricated from drawn sheet metal parts, is efficient in use, is composed of a minimum number of parts and is unlikely to become unserviceable.

Another object of this invention is to provide an accumulator having two outer shells which may be easily and quickly assembled and permanently secured together by means of welding at a point remote from the position of the bladder within the shells.

A further object of this invention is to provide an accumulator having a bladder molded open on one end which cooperates with a retainer within the two outer shells to form a pneumatic chamber.

The above and other objects and features of the invention will be apparent from the following description of the apparatus taken in connection with the accompanying drawing which forms a part of this specification.

Referring now to the single figure of the drawing, the numeral 10 designates an accumulator which has a lower shell 12 and an upper shell 14. The lower shell 12 has a spherically rounded portion 16, a cylindrical portion 18 which surrounds the rounded portion, and a generally rounded fold 20 which connects the two portions. The upper shell 14 has a hemispherical portion 22 and a cylindrical portion 24 extending from the hemispherical portion which envelops the cylindrical portion 18 of the lower shell 12 in such a manner that the cylindrical portions of each shell will be contiguous. A supporting member 26 having a substantially cylindrical shape is placed between the rounded and cylindrical portions of the lower shell for reinforcement. The upper and lower shells and the supporting member are connected together by a weld 28. The lower shell 12 has a pneumatic opening 30 and the upper shell 14 has an opening 32 for passage of hydraulic fluid. A hydraulic fitting 34 is welded or otherwise securely attached to the upper shell at 36.

A bladder 38, which is molded open on one end, is disposed within the upper shell 14 and is secured therein by a retainer 40 to form a pneumatic chamber 42 with said retainer. A hydraulic chamber 43 is formed between the bladder 38 and the upper shell 14. The retainer has a spherically rounded portion 44 which is contiguous with the spherically rounded portion 16 of the lower shell 12 and a substantially cylindrical extension 46 the end of which is rolled over to provide a bead 48. The cylindrical extension 46 and the bead 48 of the retainer secure the end of the bladder at the junction 50 of the lower and upper shells. A pneumatic valve 52 is welded to the retainer 40 at 54 and passes through opening 30 of the lower shell 12. The outer portion of the valve is threaded so that a nut 56 can hold the retainer 40 tightly against the lower shell 12.

The bladder 38 is preferably provided with a substantially rigid or stationary portion 58 which is formed to fit snugly against the cylindrical portion 24 of the upper shell from the junction 50 to substantially the equatorial line 60 of the accumulator and a flexible portion 62 which extends from the equatorial line to the closed end of the bladder and is adapted to fold into the stationary portion 58 to a lesser or greater extent when hydraulic fluid enters the hydraulic chamber 43 and compresses the gas within the bladder. If the gas becomes completely exhausted from within the bladder for any reason and hydraulic fluid enters the opening 32, the flexible portion 62 will be completely telescoped into the stationary portion 58 and will fold about the equatorial line 60 due to the increased thickness of the stationary portion.

In order to prevent the trapping of hydraulic fluid between the bladder and the upper shell, small buttons or bosses 64 are provided on the exterior surface of the flexible portion 62 of the bladder. The bosses 64 on the bladder contact the upper shell first and maintain the outer surface of the bladder intermediate the bosses in spaced relation with respect to the shell, so that any fluid trapped between the bladder and the shell at a point spaced away from the hydraulic opening 32 can still flow between the bosses 64 to the opening 32.

The closed end of the bladder is reinforced with a rigid bladder button 66 to prevent the extrusion of the flexible bladder wall into the hydraulic opening 32 in case of hydraulic pressure failure. A porous metal insert 68 is placed within the gas opening to prevent the extrusion of the bladder in the event of gas loss. This type of metal will form an impervious wall to material such as synthetic rubber but will not prevent gas from passing freely therethrough.

The flexible portion 62 of the bladder preferably has a relatively flat end spaced from the end of the upper shell when the bladder is in an unstressed position since it has been found that this construction tends to promote the orderly collapse and distension of the bladder during operation.

By using a construction of the type described, applicant has provided an accumulator which is highly efficient and economical to fabricate. The spherical form of the accumulator permits the greatest economy in material since a spherical accumulator will give the most strength for the least weight. By providing the upper and lower shells with cylindrical portions it is possible to weld the shells together at a point remote from the bladder so that the welding heat will not damage the bladder. The advantage of a welded connection could not be used where the outer shell connections are at or near the equatorial point of the bladder as is shown in certain prior art patents. Furthermore, by using applicant's construction, it is possible to simultaneously weld both shells 12 and 14 and the supporting member 26 to each other. The supporting member is used in order to reinforce the fold 20 since the highest stresses in the accumulator would be located at this point of curvature. Thus with the aid of this supporting member it is possible to use very thin shells, no thicker than necessary to resist the spherical tensile stresses. Suppose for the moment that the ring 26 has been omitted from the assembly; then the portion of the lower shell 12 shown at A—A would be subject to severe shear stresses and also to tension tending to progressively roll the fold 20 downward. Presence of the ring 26 prevents the application of localized stresses to the lower shell 12 greater than the normal spherical tensions. This innovation permits the use of thinner and lighter shells than would otherwise be required and fabrication by cheap welding methods.

By using a bladder which is molded open on one end a further economy is achieved since substantially closed bladders must be molded by using sectionalized cores or by molding two halves of the bladder and joining them in some manner.

The several practical advantages which flow from this hydro-pneumatic energy storing device are believed to be obvious from the above, and other advantages may suggest themselves to those who are familiar with the art to which this invention relates.

Having thus described the various features of the invention, what I claim as new and desire to secure by Letters Patent is:

1. A hydro-pneumatic energy storing device comprising a first shell having a pneumatic opening, a second shell having an opening for passage of hydraulic fluid, said first shell having a spherically rounded portion and a cylindrical portion, said cylindrical portion surrounding said rounded portion, said second shell having a hemispheric portion and a cylindrical portion extending therefrom, said cylindrical portion of the second shell encircling the first shell so that the cylindrical portions of each shell will be contiguous, a substantially cylindrical supporting member between the spherically rounded portion and the cylindrical portion of the first shell for reinforcing said first shell, an open ended bladder disposed within said second shell to form a hydraulic chamber with said second shell, a retainer having a spherically rounded portion contiguous with said first shell and a substantially cylindrical extension with a bead formed thereon for securing the end of the bladder at the junction of the first and second shells, said retainer forming a pneumatic chamber with said bladder, a pneumatic valve connected to said retainer and passing through the opening in said first shell, means for attaching said retainer to said first shell, a hydraulic fitting attached to said second shell, and means comprising a weld serving to connect the supporting member and the cylindrical portions of said shells to each other at a point remote from the junction of said first and second shells.

2. An accumulator of the type in which hydraulic fluid reacts against a cushion of highly compressed gas, comprising a first and second shell, one of which has an opening for introduction of compressed gas and the other of which has an opening for passage of hydraulic fluid, said first shell having a spherically rounded portion and a cylindrical portion, said cylindrical portion surrounding said rounded portion, said second shell having a hemispherical portion and a cylindrical portion extending therefrom, said cylindrical portion of the second shell encircling the first shell so that the cylindrical portions of the first and second shells will be contiguous, a supporting member between the spherically rounded portion and the cylindrical portion of the first shell, an open ended bladder disposed within said second shell, a retainer having a spherically rounded portion contiguous with said first shell and an extension with a bead formed thereon for securing the end of the bladder at the junction of the first and second shells, and means comprising a weld serving to connect the supporting member and the cylindrical portions of said shells to each other.

3. An accumulator of the type in which hydraulic fluid reacts against a cushion of highly compressed gas comprising a first and second shell, one of which has an opening for introduction of compressed gas and the other of which has an opening for passage of hydraulic fluid, said first shell having a rounded portion and a cylindrical portion, said cylindrical portion surrounding said rounded portion, said second shell having a rounded portion and a cylindrical portion extending from said rounded portion, said cylindrical portion of said second shell encircling the first shell so that the cylindrical portions of the first and second shells will be contiguous, a supporting member between the rounded portion and the cylindrical portion of the first shell, a bladder disposed within said second shell, a retainer having a rounded portion contiguous with said first shell, said retainer securing the end of the bladder at the junction of the first and second shells, and means for connecting the supporting member and the cylindrical portions of said shells to each other.

4. A hydro-pneumatic energy storing device comprising a first shell having a spherically rounded portion and a cylindrical portion surrounding said rounded portion, said two portions forming a fold therebetween, a second shell having a hemispherical portion and a cylindrical portion extending therefrom, said cylindrical portion of the second shell enveloping the cylindrical portion of the first shell, a substantially cylindrical supporting member abutting the fold formed by the rounded and cylindrical portions of said first shell, a bladder disposed within said second shell, a retainer connected to said first shell, said retainer securing the bladder at the junction of the first and second shells, and means comprising a weld serving to connect the supporting member and the cylindrical portions of said shells to each other at a point remote from the junction of said first and second shells.

5. An accumulator of the type in which hydraulic fluid reacts against a cushion of highly compressed gas, comprising a first and second shell, one of which has an opening for introduction of compressed gas and the other of which has an opening for passage of hydraulic fluid, said first shell having a rounded portion and a cylindrical portion connected to said rounded portion, said cylindrical portion surrounding said rounded portion, said second shell having a rounded portion and a cylindrical portion extending from said rounded portion, said cylindrical portion of said second shell encircling the first shell so that the cylindrical portions of the first and second shells will be contiguous, a bladder disposed within said second shell, a retainer extending from said first shell for securing the end of the bladder at the junction of the first and second shells, and means for connecting the cylindrical portions of said shells to each other at a point remote from the junction of said first and second shells.

6. A hydro-pneumatic energy storing device comprising a first shell having a spherically rounded portion and a cylindrical portion connected to and surrounding said rounded portion, a second shell having a hemispherical portion and a cylindrical portion extending therefrom, said cylindrical portion of the second shell enveloping the cylindrical portion of the first shell, a bladder disposed within said second shell, retaining means connected to said first shell, said retaining means securing the bladder at the junction of the first and second shells, and means comprising a weld serving to connect the cylindrical portions of said shells to each other at a point remote from the junction of said first and second shells.

References Cited in the file of this patent

UNITED STATES PATENTS

| | | |
|---|---|---|
| 2,216,374 | Martin | Oct. 1, 1940 |
| 2,339,076 | Huber | Jan. 11, 1944 |
| 2,378,467 | De Kiss | June 19, 1945 |
| 2,397,248 | De Kiss | Mar. 26, 1946 |
| 2,740,259 | Westlund | Apr. 3, 1956 |
| 2,757,689 | Knox | Aug. 7, 1956 |